United States Patent [19]
Heartz

[11] Patent Number: 4,715,005
[45] Date of Patent: Dec. 22, 1987

[54] TERRAIN/SEASCAPE IMAGE GENERATOR WITH MATH MODEL DATA BASE

[75] Inventor: Robert A. Heartz, DeLand, Fla.
[73] Assignee: General Electric Company, Philadelphia, Pa.
[21] Appl. No.: 638,706
[22] Filed: Aug. 8, 1984
[51] Int. Cl.$^4$ .............................................. G09B 9/08
[52] U.S. Cl. ..................................... 364/521; 342/64; 434/43; 340/720
[58] Field of Search ............... 364/518, 520, 521, 424; 340/700, 703, 720, 286 M; 342/64, 65; 434/43

[56] References Cited

U.S. PATENT DOCUMENTS

| | | | |
|---|---|---|---|
| 4,077,062 | 2/1978 | Nielsen | 364/521 |
| 4,086,632 | 4/1978 | Lions | 364/521 X |
| 4,343,037 | 1/1982 | Bolton | 364/521 |
| 4,533,910 | 7/1985 | Sukonick et al. | 364/521 X |
| 4,572,506 | 2/1986 | DiOrio | 364/521 X |
| 4,586,038 | 4/1986 | Sims et al. | 434/43 X |

Primary Examiner—Gary V. Harkcom
Assistant Examiner—R. R. Herndon
Attorney, Agent, or Firm—Stephen A. Young; Paul Checkovich

[57] ABSTRACT

A technique for the real-time computer generation of visual scenes of rolling terrain and sea waves is based on a view ray approach wherein an azimuth sweep is defined and an image profile is generated by incrementing range steps from the view point but employs a data base which is an on-line math model consisting of a summation of cosine functions rather than a grid data base. Math models are generated separately for both land and sea elevation posts for the scene to be generated. A horizontal field of view is defined as a predetermined number of increments between sweeps perpendicular to a boresight from a view point, and a vertical field of view is defined as a predetermined number of increments between view rays perpendicular to the boresight from the view point. The change in range is incremented along the boresight from the view point, and for each range increment, the view ray is stepped down by an increment corresponding to an incremental change in the tangent of the view angle. An elevation value of the view ray is accumulated for each incremental change in the tangent of the view angle. For each range increment, the math model for the land elevation posts is compared with the math model for the sea elevation posts, and the latter of the two is selected. At each range increment, the accumulated elevation value of the view ray is compared with the selected math model of elevation posts and, if a view ray strikes the selected elevation post, the data for that post is read to a display; otherwise, the math models of the land and sea elevation posts are incremented.

23 Claims, 18 Drawing Figures

ADDRESS GEOMETRY $$x = x_V + \frac{R'}{\cos\psi_S}[\cos(\psi_{BS} - \psi_S)]$$

$$x = x_V + \frac{R'}{\cos\psi_S}[\cos\psi_{BS}\cos\psi_S + \sin\psi_{BS}\sin\psi_S]$$

$$= x_V + R'(\cos\psi_{BS} + \sin\psi_{BS}\tan\psi_S)$$

$$R' = n\Delta R' = \sum_n \Delta R', \quad \tan\psi_S = m\Delta\tan\psi = \sum_m \Delta\tan\psi$$

$$x_{nm} = x_V + n\Delta R'\cos\psi_{BS} + n\Delta R'm\Delta\tan\psi\sin\psi_{BS}$$

INCREMENT RANGE, $(n+1)\Delta R'$ $$x_{n+1,m} = x_{nm} + \Delta R'\cos\psi_{BS} + m\Delta R'\Delta\tan\psi_S\sin\psi_{BS}$$

INCREMENT SWEEP, $(m+1)\Delta\tan\psi$ $$x_{n,m+1} = x_{nm} + n\Delta R'\Delta\tan\psi\sin\psi_{BS}$$

VIEW RAY GEOMETRY $$z' \approx h - \frac{R}{\cos\phi}[\sin(\phi_{BS} + \phi_m)]$$

$$\approx h - R(\sin\phi_{BS} + \cos\phi_{BS}\tan\phi_m)$$

$$z'_{nm} \approx h - n\Delta R\sin\phi_{BS} - n\Delta Rm\Delta\tan\phi\cos\phi_{BS}$$

FIG. 6   INCREMENT RANGE, $(n+1)\Delta R$ $$z'_{n+1,m} = z'_{nm} - \Delta R\sin\phi_{BS} - m\Delta R\Delta\tan\phi\cos\phi_{BS}$$

INCREMENT VIEW RAY, $(m+1)\Delta\tan\phi$ $$z'_{n,m+1} = z'_{nm} - n\Delta R\Delta\tan\phi\cos\phi_{BS}$$

FIG. 7

$z_\rho = R TAN\psi_S TAN\rho$ $z_{nm\rho} = n\Delta R_m \Delta TAN\psi TAN\rho$ $\rho$ = ROLL ANGLE ABOUT BORESIGHT

NORMAL
$z = A \sin \frac{2\pi}{L} y$
$= A \sin y'$

ROTATE
$x' = [x \cos\beta + y \sin\beta]\frac{2\pi}{L}$
$y' = [-y \cos\beta + x \sin\beta]\frac{2\pi}{L}$
$z = f(x', y')$ y SHEAR
$x' = x\frac{2\pi}{L}$
$y' = [-y \cos\beta + y \sin\beta]\frac{2\pi}{L}$
$z = A \sin y'$

TERRAIN/SEASCAPE IMAGE GENERATOR WITH MATH MODEL DATA BASE

CROSS-REFERENCE TO RELATED APPLICATION

The present invention is an improvement to my invention described in U.S. patent application Ser. No. 546,599 now U.S. Pat. No. 4,583,185 entitled "Incremental Terrain Image Generator", and assigned to the assignee of this application. The subject matter of my earlier filed application is incorporated herein by reference.

FIELD OF THE INVENTION

This invention generally relates to a system and technique for the generation of images on a display device and, more particularly, to real-time computer simulation of visual images of perspective scenes such as landscapes and seascapes.

BACKGROUND OF THE INVENTION

The principle application area for computer image generation (CIG) has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Computer generation of visual representations of objects whose various vertices, edges and planes are defined by data bases referenced to a system of axes is described in U.S. Pat. No. 3,603,703 to Warnock, U.S. Pat. No. 3,621,214 to Romney et al, and U.S. Pat. No. 3,665,408 to Erdahl et al. These teach general means for converting such data into a two-dimensional perspective view, with tests for determining which of several overlapping objects will be visible and conceal the others. The scan employed for presentation of the visual image on a cathode-ray tube (CRT) is a conventional horizontally scanned raster. U.S. Pat. No. 3,671,729 to Lux teaches means to cause a mechanical plotter to draw curves or profiles (provided as electrical input signals giving elevation and range for successive radial scans) in which the profile parts which would be out of the field of view of an elevated observer are omitted. The device is not indicated as having any application to electronic image generation, nor does it appear that it could be so applied. U.S. Pat. No. 3,736,564 to Watkins teaches the conversion of electrical signals defining surfaces of a three-dimensional object onto a device such as a CRT. The converted signals define the relative depths of segments of the surfaces along each scan line of the display and selectively subdivide the scan lines according to the visual characteristics of the segments when necessary. Signals defining the visible segments are then utilized to control the intensity of the display.

The real-time computer generation of visual images of landscapes and seascapes finds particular use in aircraft or ship simulators. U.S. Pat. No. 3,769,442 to Heartz et al describes a process for producing a compressed data base for a radar land mass simulator. U.S. Pat. No. 4,017,985 to Heartz describes a process for the generation of a perspective scene in which the tangent of the view angle is computed for each range element along a sweep. This process requires a high speed multiply and divide to compute the tangent which is then compared to a stored maximum to determine if the element is seen. If it is seen, it is compared to the last value to fill in skipped pixels. U.S. Pat. No. 4,343,037 to Bolton describes a visual display system in which a pipeline processor is used to compute in real-time the perspective transformation from the textured ground surface plane to the display plane. application Ser. No. 527,809 filed Aug. 30, 1983 abandoned Aug. 13, 1986, by M. Bunker and assigned to the assignee of this application discloses techniques to reduce dynamic aliasing problems in real time images generated from a textured grid data base.

Real-time generation of visual scenes is at best a difficult computational problem. The more realistic the scene, the more complex the computational problem seems to become. This in turn imposes a severe requirement on then hardware design. In my prior application Ser. No. 546,599 now U.S. Pat. No. 4,583,185, I describe an algorithm for the real-time computer generation of visual scenes that uses a few simple mathematical functions resulting in a significant speed-up of scene generation time and a corresponding simplification of the hardware requirements. I accomplished this by replacing the multiply and divide operations normally performed with simple, repetitive accumulate operations. Seen elements and pixel fill-in are implemented by a single compare. The range elements of the sweep are scanned by progressively incrementing a delta view angle tangent. Occulting is determined by comparing the projection on the Z axis of delta view angle tangent at the element range to the altitude minus element elevation. If the projection is greater than altitude minus element elevation, the point is seen and the delta tangent view angle is incremented. Otherwise, the point is hidden and the range is incremented. The invention described in my prior application Ser. No. 546,599 uses an X-Y grid data base of the type produced by the Defense Mapping Agency (DMA) in contrast to the vector schemes that were typically used in the prior art. Since only simple addition operations performed with an accumulator and a compare operation are used, the mathematical processing is greatly simplified when compared with the multiplication and division operations resorted to by the prior art.

One problem which adversely affects the realism of the generated visual scene is that on very close approach scenes, there is an undesirable scintillation or evident discontinuities due to edges or grids which results from the use of the grid data base. Both CIG and digital radar landmass simulator systems convert the grid elevation data base to a vector, or edge, format. This is done to compress, or reduce the on-line data base. However, in areas of rough, or rolling terrain, every grid point provides unique information. The data base cannot be further compressed. Furthermore, where close approach terrain images are required, such as for tank crew training, pilot training in low level nap of earth flight operations, and training operators of air cushion landing vehicles, the triangular structure of the data base edges becomes evident. The continuous rolling nature of the terrain is broken up and false cues are given to the trainee. In fact, when close approach flowing terrain images are required, the opposite of data compression must be implemented. That is, the DMA data base must be further enhanced by on-line interpolation and texturing.

SUMMARY OF THE INVENTION

It is therefore an object of the present invention to provide an improvement in the quality of a computer image generated close approach scene without sacrificing the simplification in hardware requirements and the significant speed-up of scene generation time achieved in my earlier invention.

It is another object of this invention to provide a low cost image generator that produces realistic scenes of rolling terrain and sea waves for training devices.

The objects of the invention are accomplished by using the view ray approach described in my prior application Ser. No. 546,599 wherein an azimuth sweep is defined and an image profile is generated by incrementing range steps from the view point. However, the present invention takes advantage of the fact that there are many training applications where a real world data base is not required. For example, training a pilot to fly at very low altitudes or to operate an air cushion landing vehicle can be accomplished with synthetic data bases. The data base for the present invention is an on-line math model which consists of a summation of cosine functions rather than the grid data base used in my earlier invention. Thus, for every screen pixel, there is a unique and continuous elevation and color cell. Realism is further enhanced by adding three dimensional texture for land clutter and surf break-up. There are several unique advantages to this approach:

(1) An on-line data base is not required to define the sea waves, rolling terrain and the land/sea interface (surf). Of course, a data base is required to define the ship models, beach objects and terrain texture.

(2) The waves are smooth rolling functions with no discontinuities caused by edges. Wave shading is a simple derivative of wave elevation.

(3) View ray processing is implemented by repetitive accumulator and compare functions. Per pixel multiplies, divides and complex functions are not required.

(4) View ray processors can be pipelined or paralleled to achieve high speed operation (i.e. 1024 x 1024 images).

BRIEF DESCRIPTION OF THE DRAWINGS

The foregoing and other objects, aspects and advantages of the invention will be better understood from the following detailed description with reference to the drawings, in which.

DETAILED DESCRIPTION OF THE INVENTION

Figure 1:
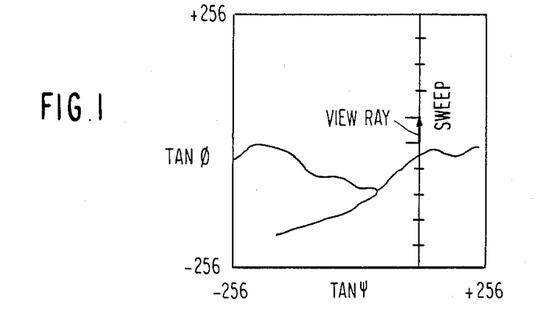
FIG. 1 is a diagramatic illustration of a 512×512 element CRT display wherein the number of elements corresponds to a grid data base.
Figure 2:
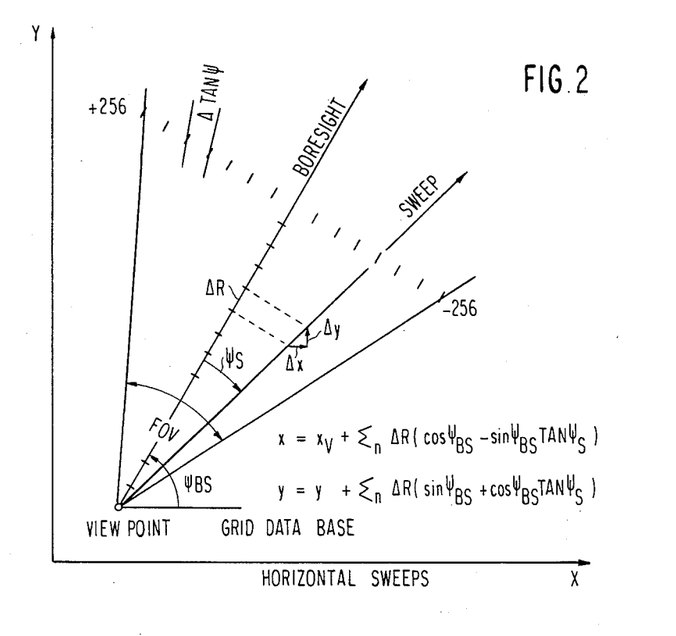
FIG. 2 is a graphical representation of the horizontal sweeps from the view point.

A description of the land/seascape image generator according to the present invention must be preceded with an understanding of the view ray approach which will be described with reference to FIGS. 1 to 4 of the drawings. Terrain occulting, that is what is hidden from a specific viewpoint, is a key calculation to all image generators. My earlier invention described in application Ser. No. 546,599 provided a fast summation algorithm for generating occult data or perspective scenes using grid elevation data bases. Such grid data bases are produced, for example, by the Defense Mapping Agency (DMA). A DMA terrain elevation data base is typically a 512×512 array of elevation posts that are 300 feet apart. A corresponding planimetric grid data base defines feature colors such as for lakes, forests, snow caps, fields and so forth. According to the view ray processing technique, a vertical column of the output image, i.e. a vertical raster, is first defined as a sweep which is composed of 512 view ray elements, as shown in FIG. 1. The horizontal field of view (FOV) is defined as plus and minus 256 sweeps which are defined by equal increments perpendicular to the boresight. Any sweep is transformed to the grid data base as shown in FIG. 2. The processing starts incrementing ΔR from the view point. ΔR is shown as equal steps, but in practice, the ΔR steps are expanded as they move away from the view point. For any sweep, a ΔX and ΔY can be defined. The accumulation of ΔX and ΔY is the X,Y data base address which is used to extract the elevation and color for that sweep element.

Figure 3:
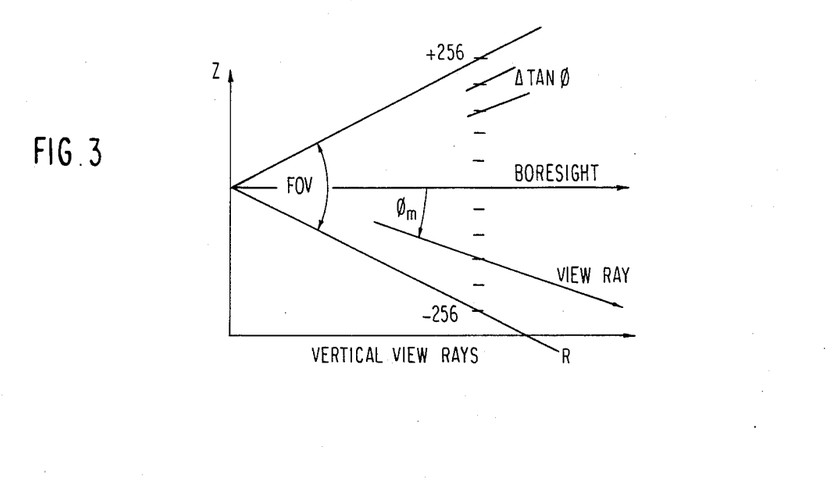
FIG. 3 is a graphical representation of the vertical sweeps from the view point.
Figure 4:
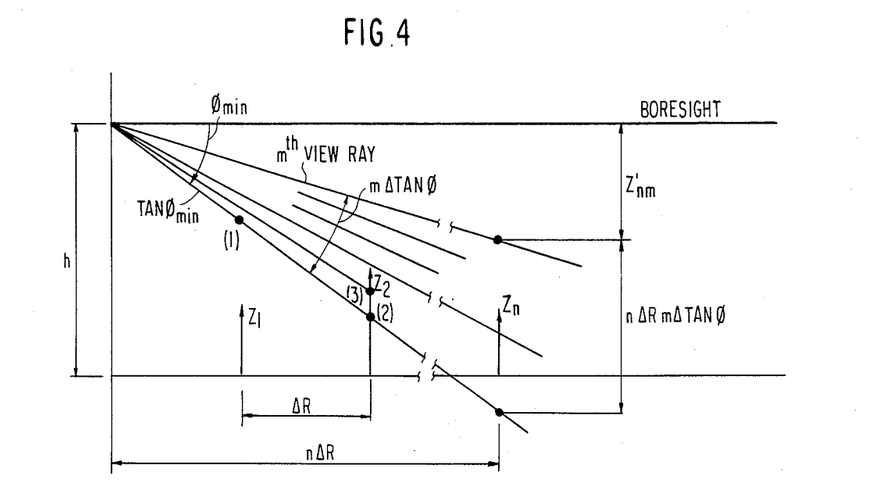
FIG. 4 is a graphical illustration of the view ray processing according to my prior invention.

For a given sweep, the vertical view rays are shown in FIG. 3. Again, the field of view is defined as plus or minus 256 equal steps normal to the view ray. The view ray processing is illustrated in FIG. 4. For each range increment, the view ray steps down by an increment of $\Delta R \tan \phi_{min}$. A simple compare at each range increment determines if the view ray strikes an elevation post. If the view ray is above the elevation post, the next elevation post and color is read from the data base. If the view ray strikes the post, the color for that post is read to the CRT display via a refresh memory.

Considering FIG. 4 in more detail, the edge of the vertical field of view is $\phi_{min}$. The first view ray projection (point 1) on the Z axis is $\Delta R \tan \phi_{min}$. Since $\Delta R \tan \phi_{min}$ is less than $(h - Z_1)$, $Z_1$ does not intersect the field of view, and therefore we increment to the next elevation, $Z_2$. The projection of the view ray at $Z_2$ is $2\Delta R \tan \phi_{min}$. This is greater than $(h - Z_2)$ which means that $Z_2$ is seen. The tangent of the view angle is incremented to point 3 and, again, $Z_2$ is seen. The tangent of the view angle is incremented until its projection on the Z axis is greater than $(h - Z_2)$, then we increment to the next elevation point and so forth. It is therefore evident that if a view ray strikes an elevation post, that point is seen and remains seen until the view ray is incremented to a point above the elevation post. If a view ray is above an elevation post, then the point is occulted.

Summarizing, for each range increment, the view ray steps down by an increment of $\Delta R \tan \phi_m$, where the subscript "m" refers to the $m^{th}$ view ray. For each range increment, the distance between sweeps increases by the increment $\Delta R \Delta \tan \phi$. A simple compare at each range increment determines if the view ray strikes an elevation post. If the view ray is above the elevation post, the next elevation post and color is read from the data base. If the view ray strikes the post, the color for that post is read to the display via the refresh memories. Thus, view ray processing is implemented by repetitive counters, accumulators and comparators. Priority is automatically handled by incrementing range and the view rays from minimum to maximum.

Figure 5:
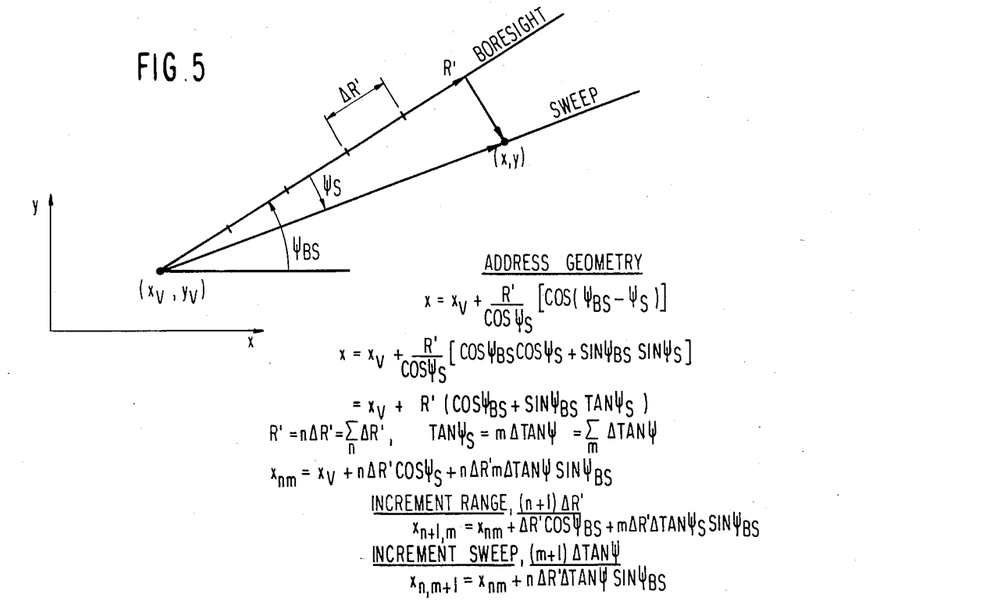
FIG. 5 is a graphical illustration of the address geometry from which is derived the incremental address equations shown in FIG. 2.

FIG. 5 is a graphical illustration of the address geometry and shows the incremental sweep equations in the azimuth plane of FIG. 2. The subscript "n" identifies a range increment. The subscript "m" identifies a sweep increment. The incremental equations for the x address are derived. The derivation of the y address is the same and results in incremental equations of the same format.

Figure 6:
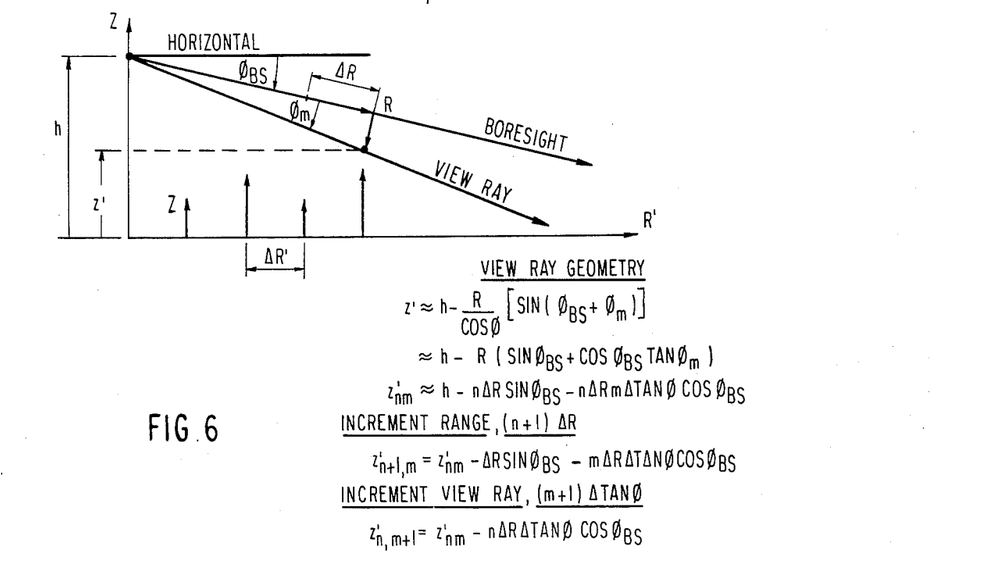
FIG. 6 is a graphical illustration of the view ray geometry from which is derived the incremental view ray equations shown in FIG. 4.

FIG. 6 is a graphical illustration of the view ray geometry and shows the derivation of the incremental view ray equations in the vertical plane of FIG. 4. The angle, $\phi_{BS}$, is boresight pitch down, or up, from the horizontal. The subscript "n" again defines a range increment but now the subscript "m" defines a view ray increment. The final equations are in the same format as the x and y address equations shown in FIG. 5.

The ΔR increments are always defined along the boresight. When the boresight is pitched, the ground, or horizontal increments, are $\Delta R \cos \phi_{BS}$ as indicated by the ΔR and R' in FIGS. 5 and 6. The exact equation for Z' is as follows:

$$Z' = h - R' \tan(\phi_{BS} + \phi_m)$$

The approximate equations of FIG. 6 are an exact solution at boresight. Distortion is introduced as the view rays move from boresight. This distortion is negligable for ±20° from boresight. This distortion introduced by the approximation is acceptable for most training simulators. The exact equations can be implemented but to do so will require a significant increase in hardware. This hardware effect is discussed in the implementation description that follows.

Figure 7:
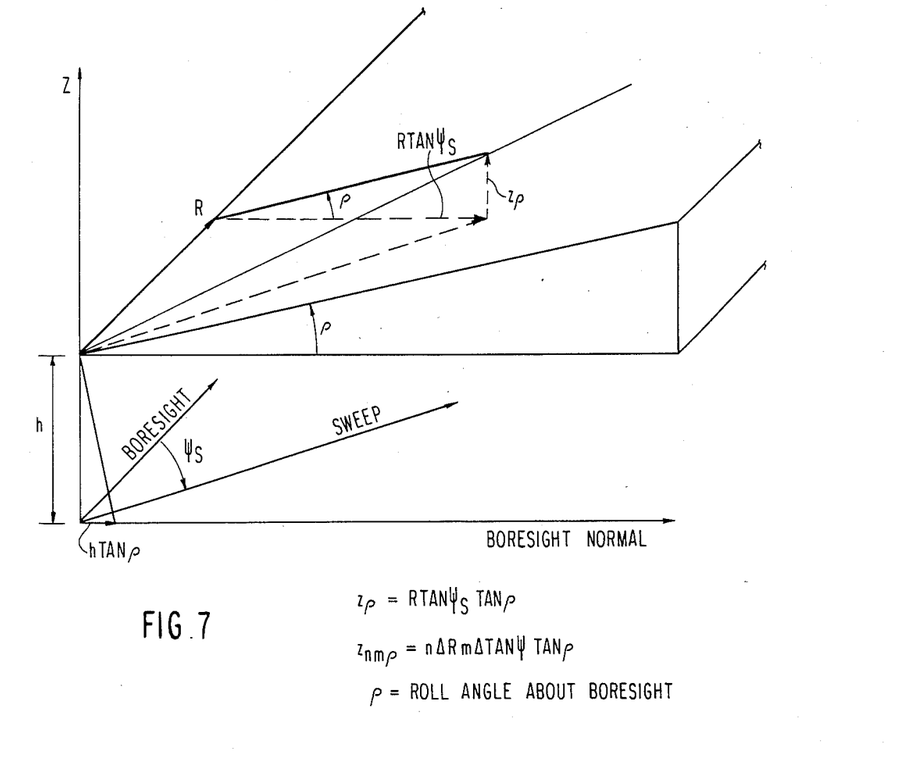
FIG. 7 is a graphical illustration of the horizontal sweep from the view point from which is derived the incremental equations for implementing vehicle, or view point, roll.

Vehicle, or boresight, pitch has been implemented in FIG. 6. Vehicle roll is implemented by rotating the data base about the horizontal boresight, $\psi_{BS}$. The derivation of the incremental equations for implementing vehicle roll angle, $\rho$, is shown in FIG. 7. The value $Z_{nm}$ is added to each elevation Z of FIG. 6.

The preceding description relates to my earlier invention described in application Ser. No. 546,599. Pitch and roll implementation is a refinement. Grid elevation, with corresponding intensity, or color, data bases are the assumed data source. The approach has the unfortunate image effect of a very apparent grid pattern in close approach scenes. Bilinear interpolation, which is costly to implement in real time, is required for smooth scenes. This grid effect can be avoided by defining an on-line math model of the land and seascape. With the math model, every view ray has a unique and continuous elevation and shading value.

Figure 8:
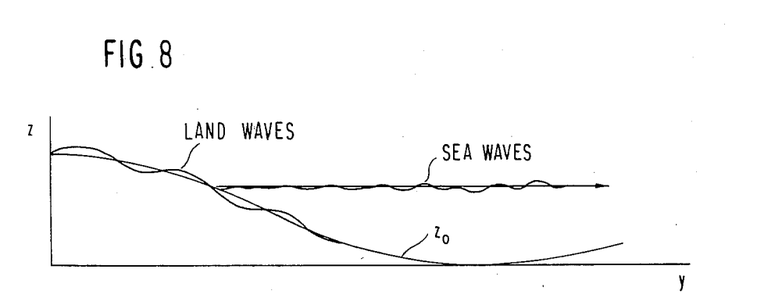
FIG. 8 is a graphical illustration of the math model used in the present invention.

The math model according to the present invention is a summation of sinusoidal functions as illustrated in FIG. 8. The land is defined by one long cosine wave, $Z_{100}$, and a summation of shorter, or higher frequency, waves. A sea level is defined and sea waves are again a summation of cosine functions. Several of the waves, for both land and sea, are rotated to provide a realistic modulated scene.

Figure 9:
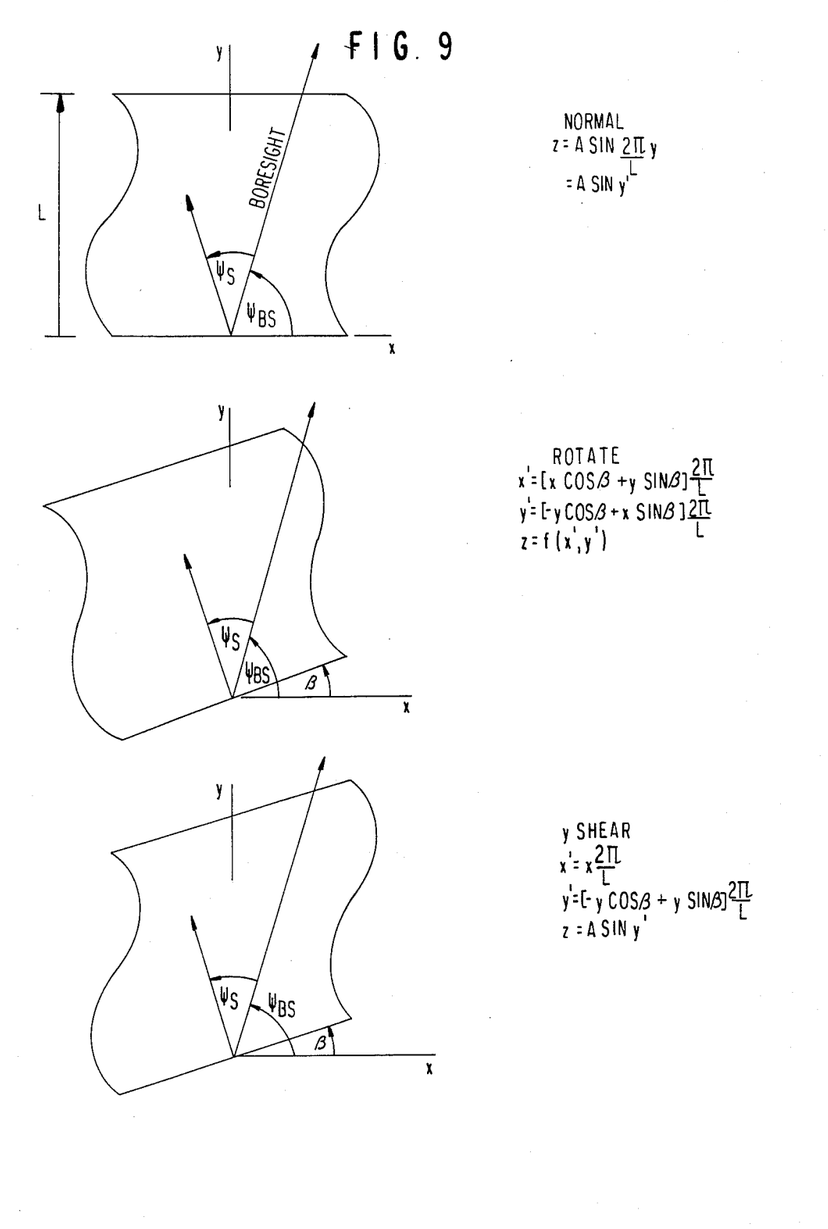
FIGS. 9A, 9B and 9C are graphical illustrations of spatial sinusoidal functions showing normal, rotated and sheared functions, respectively.

To reduce the number of equations, the waves are sheared rather than fully rotated as illustrated in FIGS. 9A, 9B and 9C. Thus, in all cases, x=x and y is a function of rotation angle, $\beta$. A sheared wave remains a sinusoidal function and a summation of sheared waves is equally effective in producing a realistic modulation to the land or sea. The equations below provide the derivation of the range and sweep incremental equations for wave generation. Again, these equations are the same format as those shown in FIGS. 5, 6 and 7.

$$x = [x_v + R(\cos \psi_{BS} + \sin \psi_{BS} \tan \psi_S)]^{2\pi/L}$$

$$y = [y_v + R(\sin \psi_{BS} - \cos \psi_{BS} \tan \psi_S)]^{2\pi/L}$$

y shear $$y' = y \cos \beta - x \sin \beta$$

$$z = A \sin y'$$

$$y' = y_v \cos \beta + R \sin \psi_{BS} \cos \beta - R \cos \psi_{BS} \cos \beta \tan \psi - x \sin \beta - R \cos \psi_{BS} \sin \beta - R \sin \psi_{BS} \sin \beta \tan \psi$$

$$y'_{nm} = y_v \cos \beta - x_v \sin \beta + n\Delta R \sin(\psi_{BS} - \beta) - n\Delta R m\Delta \tan \psi \cos(\psi_{BS} - \beta)$$

INCREMENT RANGE, $(n+1)\Delta R$ $$y'_{n+1,m} = y_{nm} + \Delta R \sin(\psi_{BS} - \beta) - n\Delta R m\Delta \tan \psi \cos(\psi_{BS} - \beta)$$

INCREMENT SWEEP, $(n+1)\Delta \tan \psi$ $$y'_{n,m+1} = y_{nm} - n\Delta R\Delta \tan \psi \cos(\psi_{BS} - \beta)$$

An example of a set of cosine functions which, when summed, produces realistic land and seascape scenes is given in Table I. The land is defined by the long wave $Z_\phi$ and four shorter waves, two of which are sheared. The sea is defined by six cosine waves.

TABLE I

Wave Height: $Z = A\cos[(2\pi/L)f(y)]$
Color: $I = dz/dy$
Speed: $C^2 = gL/2\pi \text{TanH}2 \, h/L$
$C^2 \simeq gL/2\pi$ (deep water)
$L \simeq 15$ ft/unit  $A \simeq 8$ ft/unit  $L \simeq 40 \, Z$

| | AMPLITUDE A | LENGTH L | SPEED C(fps) | SPATIAL f(y) |
|---|---|---|---|---|
| LAND | | | | |
| $Z_0$ | 100 | 1024 | — | y |
| $Z_1$ | 20 | 133 | — | y |
| $Z_2$ | −10 | 87 | — | y |
| $Z_3$ | 15 | 141 | — | $x\sin20° - y\cos20°$ |
| $Z_4$ | −25 | 313 | — | $-x\sin10° - y\cos10°$ |
| SEA | | | | |
| $Z_1$ | 0.5 | 22 | 40 | y |
| $Z_2$ | 0.3 | 13 | 20 | y |
| $Z_3$ | 0.7 | 37 | 60 | $x\sin10° - y\cos10°$ |
| $Z_4$ | 0.4 | 17 | 35 | $x\sin5° - y\cos5°$ |
| $Z_5$ | 0.01 | 4 | — | y |
| $Z_6$ | 0.01 | 5 | — | $-x\sin10° - y\cos10°$ |

A sea level is defined and a summation of sinusoids defines the sea waves. The phase of the sea waves is advanced once per frame to achieve wave motion or speed. The shading of the waves is a derivative of the elevation. Thus, it is another summation of sinusoids. The short sea waves ($Z_5$ and $Z_6$) provide a ripple effect. The shore line is defined by comparing the amplitude of summation of the sea waves plus sea level to the amplitude of the summation of land waves. When the land function is greater than the sea function, land color and shading are implemented.

There are a number of special effects which can be achieved. The absolute summation of the sea wave sinusoids plus sea level results in a predictable peak wave amplitude. Wave cresting or white caps are implemented by defining a band, which is painted white, about the peak wave amplitude. The results are wave white caps which to the viewer appear to be random and realistically move with the waves. This is a necessary visual aid in many training operations. Surf is implemented by painting the wave white at a displaced peak amplitude and when the water depth is less than a fixed bandwidth. For a vertical surface such as a pier or ship side, surf is implemented at a peak wave amplitude and a range bandwidth to the surface.

Images generated by the foregoing steps lack realism because the land, while shaded, looks like continuous sand dunes and the surf and wave crests appear to be too solid and symetrical. Realism can be enhanced by adding spatial texture to the land and the surf. Spatial texture is an X,Y map of a psuedo random code of transparent and opaque grey level cells. One approach that may be used for the texture map is an X,Y photograph of a forest area taken from a high altitude. Implementation of spatial texture requires the generation of an X,Y address for each range element. This address reads an intensity value from the spatial texture map. The intensity value modulates the surface shading generated by the summation of cosine intensity waves. Elevation can also be textured from the same map. The value from the spatial texture map is applied above a fixed land elevation so that the beach is not textured, and it is also applied when there is a flag defining surf. A road from the beach can be implemented in the texture map or by equations.

Figure 10:
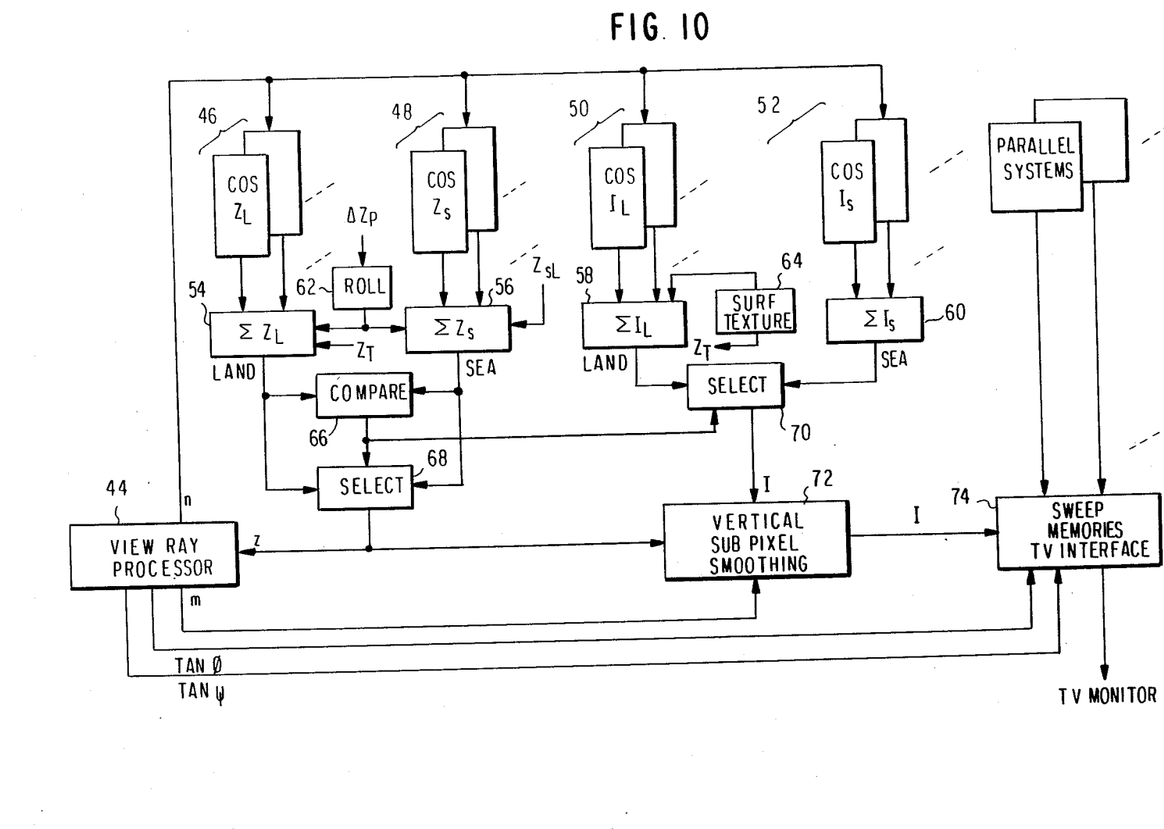
FIG. 10 is a functional block diagram of the land-/seascape image generator according to the present invention.

FIG. 10 is a functional block diagram of the land-/seascape image generator according to the invention. The view ray processor 44 controls all of the cosine generators 46, 48, 50, and 52. The cosine generators 46 provide the land elevations $Z_L$, and the cosine generators 48 provide the sea wave elevations $Z_S$. All cosine generators are incremented by the n output of the view ray processor. The outputs of the cosine generators 46 are summed in summer 54, while the outputs of the cosine generators 48 are summed in summer 56. Similar processing occurs for intensity levels. Specifically, the cosine generators 50 provide the land intensities $I_L$, and the cosine generators 52 provide the sea intensities $I_S$. The outputs of cosine generators 50 are summed by summer 58, while the outputs of cosine generators 52 are summed by summer 60.

The summers 54 and 56 are also supplied with a roll elevation signal from the roll generator 62 which has as its input the change in elevation $\Delta Z_\rho$ due to roll. Summer 54 in addition is supplied with a land texture elevation $Z_T$ generated by the surf/texture generator 64. The elevation sinusoids summed by summers 54 and 56 are compared by comparator 66 to determine whether land, sea or surf is to be implemented. The output of comparator 66 controls selector circuits 68 and 70. The output of selector circuit 68 is supplied to the view ray processor 44. If the selected elevation is not seen, the range is incremented by the output n of the view ray processor 44. If the elevation intersects the view ray (i.e. it is seen as indicated by the output m of the view ray processor 44), the summation of intensities or color for that pixel is read out from summer 58 or summer 60 or the surf/texture generator 64 depending on which is selected by the selector circuit 70. The outputs of the selector circuits are provided to the vertical sub pixel smoothing circuits 72 which provides an output to the display interface 74.

Figure 11:
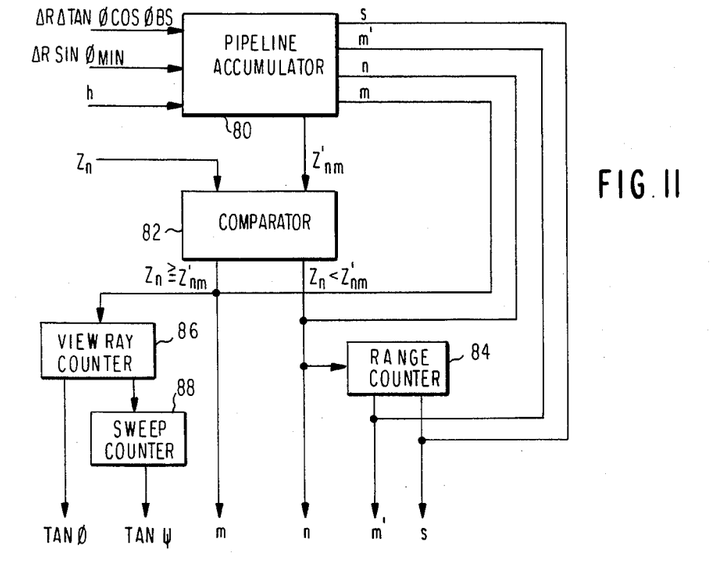
FIG. 11 is a block diagram of an implementation of the view ray processor according to my prior invention and with refinements according to the present invention.

Functionally, the operation of the view ray processor 44 is identical to my earlier invention described in application Ser. No. 546,599. The implementation shown in FIG. 11 is divided into two units: a pipeline accumulator 80 and a comparator 82. The pipeline accumulator implements the incremental equations of FIG. 6. The output $Z'_{nm}$ is the elevation of the m'th view ray at the n'th range element. Comparator 82 compares the n'th range elevation $Z_n$ with $Z'_{nm}$. If $Z_n$ is equal to or greater than $Z'_{nm}$, the elevation post is seen, and the corresponding intensity I is written into the sweep memories 74 (FIG. 10) at the address specified by the sweep, tan $\psi$, and the view ray, tan$\phi$, and the view ray is incremented. If $Z_n$ is less than $Z'_{nm}$, the elevation post is not seen, and the range is incremented to the next element. The n output signals a range increment, and the m output signals a view ray increment. Range counter 84 counts the range increments. After a fixed number of counts, it generates a shift signal s, and after another fixed number of counts it generates a sweep signal m'. View ray counter 86 generates the tan $\phi$ address to sweep memories 74 shown in FIG. 10. A fixed view ray count, for example 512 pixels, defines a sweep. This signal increments sweep counter 88 which generates the tan $\psi$ address to the sweep memories of FIG. 10.

Figure 12:
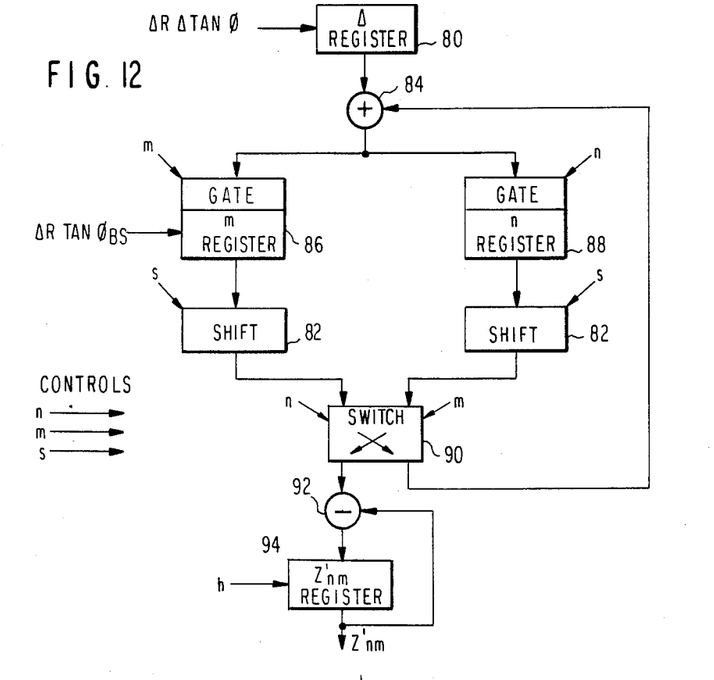
FIG. 12 is a block diagram of a pipeline accumulator according to the present invention.

FIG. 12 shows an implementation of the pipeline accumulator 80 shown in FIG. 11. Once per frame, the Δ register 81 is loaded with the value of $\Delta R \Delta \tan\phi \cos\phi_{BS}$. At the beginning of each sweep, m register 87 is loaded with the minimum view ray increment, $\Delta R\sin\phi_{min}$, and the $Z'_{nm}$ register 94 is loaded with the view point altitude, h. m register 87 always contains the change in view ray elevation per range increment. n register 89 always contains the change in elevation per view ray increment. The n and m signals from comparator 82 (FIG. 11) control the operations. For example, if range is incremented, then the m register 87 is read out through switch 90 to summer 92, and n register 89 is read out through switch 90 to the summer 85. If the view ray is incremented, the operations are switched as indicated by the crossed arrows in switch 90. Switch 90 can be implemented by two parallel multiplexers. For all operations, the output of the accumulator 94 and 92 is always the elevation of the view ray.

The shift by shift register 83 initiated by the signal s from range counter 84 in FIG. 11 provides smaller increments in the perspective image foreground. Typically at the sweep beginning, the increment value of register 81 is divided by eight (a shift of three) and then, as the range increases, the increment is divided by four, by two, and finally by one. The increment size, which is the sampled grid size, should approximately equal the perspective image pixel size. A large increment in the foreground produces evident serration effects. On the other hand, very small increments increase image generation time which, in real time systems, directly relates to increased hardware requirements. In most applications, some serration in the immediate foreground is acceptable.

Figure 13:
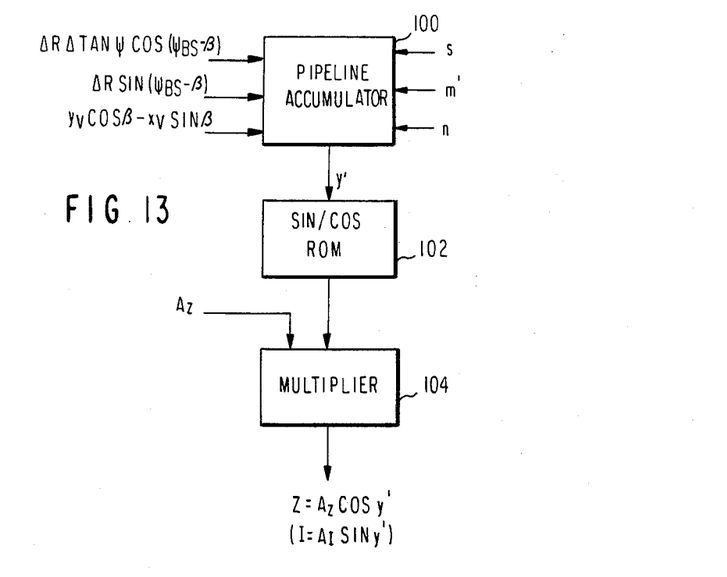
FIG. 13 is a block diagram of the implementation of the wave generator according to the present invention.

FIG. 13 shows the implementation of a cosine generator 46, 48, 50 or 52 shown in FIG. 10. The implementation of pipeline accumulator 100 is identical to that shown in FIG. 12; however, pipeline accumulator 100 implements the incremental range and sweep equations set forth above for wave generation. Referring to FIG. 12, register 81 is loaded once per frame with the value of $\Delta R \Delta \tan\psi \cos(\psi_{BS}-\beta)$. m register 87 is also loaded once per frame with the increment for the minimum sweep value of $\Delta R\sin(\psi_{BS}-\beta)$. Accumulator register 94 is loaded at the beginning of each sweep by the constant $(y_v\cos\beta - x_v\sin\beta)$. In the generation of sea waves, this value is increased each frame to simulate wave velocity. Pipeline accumulator 100 is incremented at each n control signal from the view ray processor 44 shown in FIG. 10. The n control signal is the signal to increment to the next sweep. This signal is generated by comparator 82 of FIG. 11. At this signal, switch 90 of FIG. 12 is toggled so that m register 87 is incremented to the next sweep. Note that in normal operation, n register 89 is not used in sweep generation. It has a potential use in more complex scenes where a curved wave pattern is required.

The sin/cos ROM 102 is a table look-up read only memory where y' is the address and the output is the cosine of y'. Multiplier 104 scales the cosine term. The implementation of the intensity cosine generators 50 and 52 of FIG. 10 is the same as the elevation terms except that a constant phase shift is introduced. This is indicated by the parenthetical output term in FIG. 13.

Sin/cos ROM 102 and multiplier 104 can be replaced by a single random access memory (RAM). The RAM output is the precomputed and stored Z or I. The RAM approach costs less but is also less flexible. The preferred implementation is a mixture of both. Land waves which are always fixed can be implemented with a RAM. Sea waves, where a changing shape with time may be required, must be implemented by a ROM and multiplier.

Figures 14, 15:
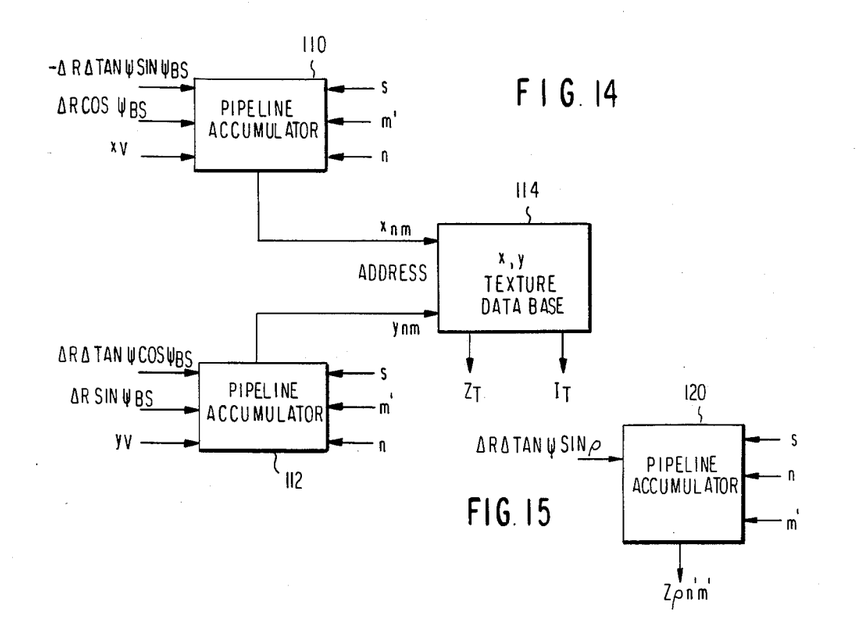
FIG. 14 is a block diagram of an implementation of a texture generator which may be used with my invention.
FIG. 15 is a block diagram of an implementation of vehicle roll according to the present invention.

FIG. 14 shows the implementation for the texture generator 64 shown in FIG. 10. Pipeline accumulators 110 and 112 implement the incremental address equations shown in FIG. 5. Their operation is identical to pipeline accumulator 100 of FIG. 13 and their output is an x,y address to the texture map data base 114. The texture map data base 114 is a spatial psuedo random noise pattern or an aerial photograph of a forest area. The texture value, $Z_T$ or $I_T$, is summed with the land and surf values to provide a more realistic scene. $Z_T$ and $I_T$ are shown as separate outputs in FIG. 14. Since texture is a psuedo random value, one texture output can be interpreted as both an elevation and intensity value.

FIG. 15 shows the implementation of the roll elevation generator 62 shown in FIG. 10. Pipeline accumulator 120 implements the incremental equations of FIG. 7. The operation of pipeline accumulator 120 is identical to that defined for pipeline accululator 100 shown in FIG. 13. The output $Z_{pn'm'}$ is summed with both the land and sea elevations.

Figure 16:
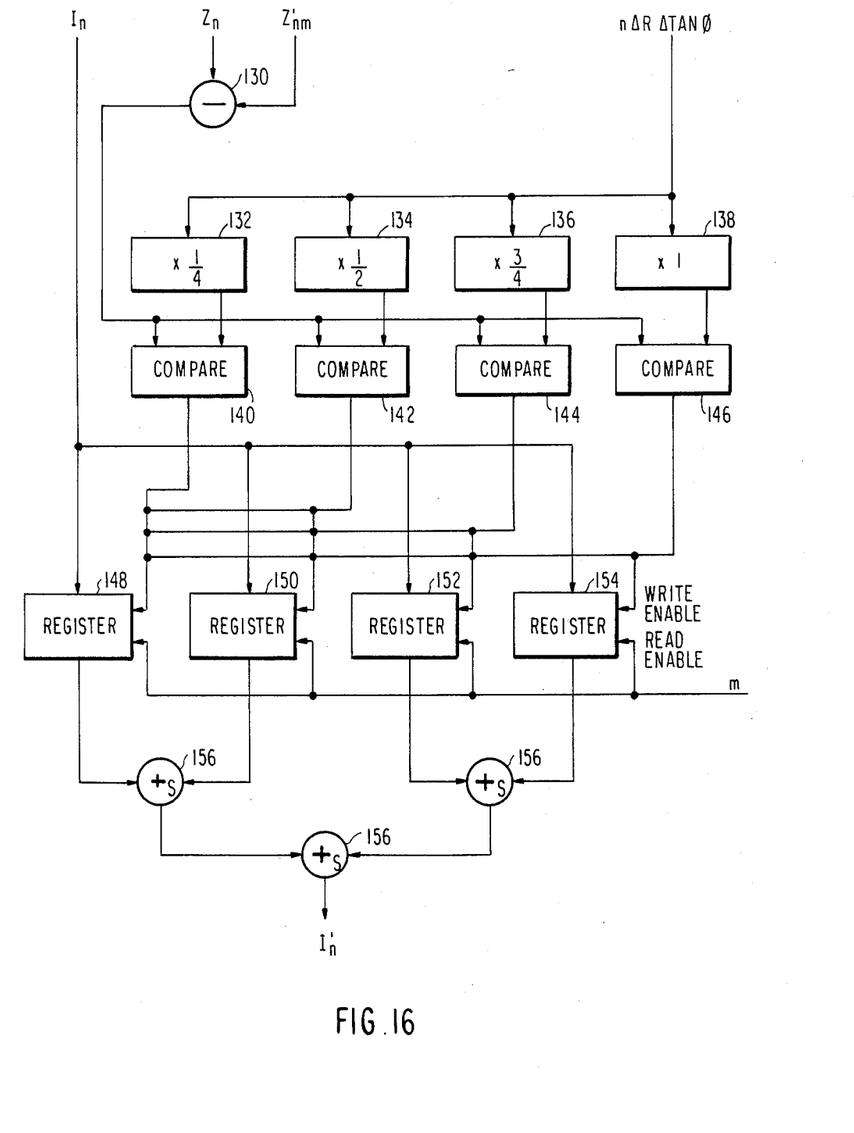
FIG. 16 is a block diagram of an implementation of vertical subpixel smoothing (area times color) according to the present invention.

The implementation of the subpixel smoothing 72 shown in FIG. 10 is illustrated in FIG. 16. The distance between view rays, $n\Delta R\Delta\tan\phi$, is divided into four equal increments as shown by blocks 132, 134, 136 and 138. Summer 130 determines the subpixel view ray penetration $\Delta Z$ of the elevation past $Z_n$ according to the following equation:

$$\Delta Z = Z_{nm} - Z_n.$$

If $\Delta Z$ is positive, $Z_n$ does not intersect the view ray and no action is taken. Comparators 140, 142, 144 and 146 compare the magnitude of $\Delta Z$ with the fractional magnitudes of $n\Delta R\Delta\tan\phi$ and generate register write enable signals for entering $I_n$ into registers 148, 150, 152 or 154 according to the logic defined in Table II below.

TABLE II

| Z | | I |
|---|---|---|
| Greater Than | Less Than | Register Enables |
| $\frac{3}{4} n\Delta R\Delta\tan\phi$ | — | 148, 150, 152, 154 |
| $\frac{1}{2} n\Delta R\Delta\tan\phi$ | $\frac{3}{4} n\Delta R\Delta\tan\phi$ | 148, 150, 152 |
| $\frac{1}{4} n\Delta R\Delta\tan\phi$ | $\frac{1}{2} n\Delta R\Delta\tan\phi$ | 148, 150 |
| — | $\frac{1}{4} n\Delta R\Delta\tan\phi$ | 148 |

Registers 148, 150, 152 and 154 are implemented so that after one write, they are locked. Any number of range increments, and the associated $Z_n$ and $I_n$, can occur between view rays, but once the registers are all loaded, they have no effect. The registers are read out on the next view ray increment in response to the m enable signal. The output is then averaged by summers 156 and written into the sweep memories 74 shown in FIG. 10.

The input parameters for the Terrain/Seascape Image Generator are derived once per frame time by a general purpose computer. In a minimum system, the general purpose computer can be a commercial single board computer and the parameters transferred to the image generator during the TV monitor vertical retrace period. A TV monitor display, with a vertical raster, can be driven directly by parallel image generators.

The previous description implements the approximate equations in FIG. 6 and will introduce some image distortion as the view rays move away from a pitched down boresight. In the exact solution, the value of Δ register 81 of FIG. 12 is a function of the view ray. Thus, Δ register 81 must be replaced by a random access memory (RAM) which is loaded once per frame and read out at each view ray increment. This is a major increase in the per frame input parameters required and an array processor will be needed to assist the general purpose computer A ping-pong buffer memory will be required to transfer parameters between the general purpose computer system and the image generator. The ping memory is loaded by the computer with parameters for the next frame while the pong memory provides the image generator with parameters for the current frame Most training simulators will require other objects, such as for example ships, buildings, trees and so forth, in the generated scene. U.S. Pat. No. 4,343,037 to Bolton and patent application Ser. No. 527,809 filed by Bunker describe techniques for generating objects that can be inserted into a computer generated image. Both of these techniques apply a comparable sweep and view ray architecture. Objects generated by these techniques can be easily merged with terrain and seascape images generated by this invention.

What is claimed is:

1. A method of real-time computer generation of visual scenes comprising the steps of:
   generating math models of land and sea elevation posts for the visual scene to be generated;
   defining a horizontal field of view as a predetermined number of increments between sweeps perpendicular to a boresight from a view point;
   defining a vertical field of view as a predetermined number of increments between view rays perpendicular to a boresight from a view point;
   incrementing a predetermined change in range along the boresight from the view point and for each range increment, stepping a view ray down by an increment corresponding to an incremental change in the tangent of the view angle;
   accumulating an elevation value of the view ray for each incremental change in the tangent of the view angle;
   for each range increment, comparing the math model for land elevation posts with the math model for sea elevation posts and selecting the larger of the two;
   comparing at each range increment the accumulated elevation value of the view ray with the selected math model of elevation posts; and
   if a view ray strikes the selected elevation post, reading the data for that post to a display means, otherwise incrementing said math models of land and sea elevation posts.

2. The method according to claim 1 wherein said step of generating math models of land and sea elevation posts includes generating sinusoidal functions having different wave lengths and summing the generated sinusoidal functions separate for forming the land and sea elevation posts.

3. The method according to claim 2 further including the steps of generating a change in elevation due to roll and adding the change in elevation to the summed sinusoidal math models of the land and sea elevation posts.

4. The method according to claim 2 further comprising the steps of:

generating summed sinusoidal math models of land and sea intensity values for the visual scene to be generated;
selecting the math model of the land or sea intensity according to the selection of the larger of the math models for the land or sea elevation posts; and
if a view ray strikes the selected elevation post, reading the data for the selected intensity for that post to the display means, otherwise incrementing said math models of the land and sea intensities.

5. The method according to claim 4 further comprising the steps of:
   storing an x,y texture data base of elevation and intensity values for the visual scene to be generated;
   accumulating x and y address values for each increment in range;
   reading texture elevation and intensity values from said texture data base using said x and y address values for each increment in tangent of the view angle; and
   summing said texture and intensity values with the land elevation and intensity values generated by said summed sinusoidal math models.

6. The method as in claim 1, wherein incrementing the predetermined change in range includes increasing the size of the range increment as the distance of the range increment from the view point increases.

7. The method as in claim 6, wherein the display means includes a predetermined perspecctive image pixel size and the range increment is approximately equal to the corresponding perspective image pixel size of the display means.

8. A computer image generator capable of the real time generation of visual scenes, comprising:
   means for generating math models of land and sea elevation posts for the visual scene to be generated;
   means for defining a horizontal field of view as a first predetermined number of increments between sweeps perpendicular to a boresight from a view point and for defining a vertical field of view as a second predetermined number of increments between view rays perpendicular to a boresight from the view point;
   means for incrementing a predetermined change in range along the boresight from the view point and for each range increment, stepping a view ray down by an increment corresponding to an incremental change in the tangent of the view angle;
   accumulation means for accumulating an elevation value of the view ray for each incremental change in the tangent of the view angle;
   first comparing means responsive to each range increment for comparing the math model for land elevation posts with the math model for sea elevation posts for the respective range increment and selecting the larger of the two;
   second comparing means responsive to each range increment for comparing the accumulated elevation value of the view ray with the math model of elevation posts selected by the first comparing means; and
   means responsive to said second comparing means for reading the data for an elevation post to a display means if a view ray strikes that selected elevation post, otherwise incrementing said math models of land and sea elevation posts.

9. The computer image generator as recited in claim 8 wherein said means for generating math models of land and sea elevation posts comprises:
  first sinusoidal function generating means for generating a first plurality of sinusoidal signals having different wave lengths;
  first summing means coupled to said first generating means for producing a summed function of land elevation posts in response to said first plurality of sinusoidal signals;
  second sinusoidal function generating means for generating a second plurality of sinusoidal signals having different wave lengths; and
  second summing means coupled to said second generating means for producing a summed function of sea elevation posts in response to said second plurality of sinusoidal signals.

10. The computer image generator as recited in claim 9 further comprising roll means coupled to said first and second summing means, said roll means for generating a change in elevation due to roll, wherein the summed functions of land and sea elevation posts respectively reflect the change in elevation due to roll.

11. The computer image generator as recited in claim 9 further comprising:
  third sinusoidal function generating means for generating a third plurality of sinusoidal signals having different wave lengths;
  third summing means coupled to said third generating means for producing a summed output signal of land intensity values in response to said third pluraslity of sinusoidal signals;
  fourth sinusoidal function generating means for generating a fourth plurality of sinusoidal signals having different wave lengths;
  fourth summing means coupled to said fourth generating means for producing a summed output signal of sea intensity values in response to said fourth plurality of sinusoidal signals;
  selection means connected to said third and fourth summing means and responsive to said first comparing means for selecting the land or sea intensity according to the larger of the math models for the land and sea elevation posts; and
  smoothing means connected to said selection means and responsive to said second comparing means for smoothing the selected intensity data and reading the smoothed data for the selected intensity for that post to the display means.

12. The computer image generator as recited in claim 11 further comprising:
  memory means for storing x,y texture data base of elevation and intensity values for the visual scene to be generated;
  second accumulating means for accumulating x and y address values for each increment in range, and memory means being responsive to said x and y address values for reading the texture elevation and intensity values from said memory means for each increment in tangent of the view angle to aid first and third summing means for modifying the summed function of land elevation posts and land intensity values, respectively.

13. The generator as in claim 8, wherein the means for incrementing includes means for increasing the size of the range increment as the distance from the view point increases.

14. The generator as in claim 13, wherein the display means includes a predetermined perspective image pixel size and the range increment is approximately equal to the corresponding perspective image pixel of the display means.

15. A method for real-time generation of a visual scene comprising:
  synthesizing the elevation of a feature of the scene, wherein synthesizing includes generating a mathematical model representative of the elevation of the feature; and
  displaying the scene as would be observed from a viewpoint wherein the scene includes the feature when the feature is not occulted,
  wherein the mathematical model includes a summation of a plurality of sinusoidal functions.

16. The method as in claim 15, wherein the feature is a sea.

17. A method for real-time generation of a visual scene comprising:
  synthesizing the elevation of a first feature of the scene;
  synthesizing the elevation of a second feature of the scene, wherein synthesizing the elevation of a second feature includes generating a mathematical model representative of the elevation of the second feature; and
  displaying the scene as would be observed from a viewpoint, wherein the scene includes the first feature when the first feature is not occulted and further the scene includes the second feature when the second feature is not occulted.

18. The method as in claim 17, wherein the mathematical model includes a summation of a plurality of sinusoidal functions.

19. An image generator for generating a visual scene in real time, comprising:
  synthesis means for generating a first mathematical model representative of the elevation of as first feature of the scene to be generated and for generating a second mathematical model representative of the elevation of a second feature of the scene to be generated; and
  means for displaying the scene wherein the first feature is included in the scene when the first feature is not occulted and further wherein the second feature is included in the scene when the second feature is not occulted.

20. The generator as in claim 19 wherein the first feature is a sea.

21. The generator as in claim 19, wherein the second feature is a land mass.

22. The generator as in claim 19, wherein the mathematical model includes a summation of a plurality of sinusoidal functions.

23. The generator as in claim 19, wherein the second mathematical model includes a summation of a second plurality of sinusoidal functions.

* * * * *